United States Patent

Opelt

[15] 3,690,591

[45] Sept. 12, 1972

[54] REMOTE CONTROL FOR RECORDERS

[72] Inventor: Christian Opelt, Bernbach, Germany

[73] Assignee: Grundig E.M.V., Kurgartenstrasse, Germany

[22] Filed: Oct. 6, 1970

[21] Appl. No.: 78,515

[30] Foreign Application Priority Data

Oct. 17, 1970 Germany..........P 19 52 330.9

[52] U.S. Cl.................242/204, 200/61.13, 242/190

[51] Int. Cl...........................B11b 15/32, G03b 1/04

[58] Field of Search......................242/182, 183–185, 242/187, 189, 190, 204, 206–210; 200/61.13

[56] References Cited

UNITED STATES PATENTS 2,778,634 1/1957 Gams et al.............242/182 X 3,141,626 7/1964 Hoskin..................242/204 X

*Primary Examiner*—Leonard D. Christian

*Attorney*—Lewis H. Eslinger, Alvin Sinderbrand and Curtis, Morris & Safford

[57] ABSTRACT

A control circuit for a tape recorder employing a novel element which senses the direction of tape motion and remembers the direction of tape motion until the tape motion is reversed. The control circuit provides rapid and controlled stopping of the tape spools. Furthermore, when the end of the tape is sensed by the control circuit, the circuit stops the tape and prevents it from being restarted in the same direction to avoid the tape from running out.

11 Claims, 8 Drawing Figures

REMOTE CONTROL FOR RECORDERS

This invention relates generally to recording and/or reproducing equipment and particularly to control circuits for such equipment.

A typical recording and reproducing equipment in which this invention will find application is a video or television tape recorder employing a magnetic tape on which there is recorded video or wide band width signals. Typically, in such a system the recording or reading head is rotated past an obliquely moving tape so that the information is stored on the tape in successive oblique or transverse tracks. In a practical system, the tape is relatively wide, e.g., 1¼ inch; and of considerable length, e.g., sufficiently long to provide an uninterrupted running time from a single tape of 1 hour's duration. The result of a wide tape of considerably length is a heavy coil of tape which for proper support is wound on large and heavy spools which in turn are driven by large and heavy spool winders having high moments of inertia.

The strong spool winders are driven by special tape tensioning motors, one for the supply spool, and one for the pickup spool. During normal recording tape operation, i.e., when the tape is moved at constant speed by a special transport roller, these tape tensioning motors are connected to a low operating voltage. However, during high speed rewinding and fast forward winding, the motors are connected to a high operating voltage, so that a high torque and a high number of r.p.m. are obtained.

If the instrument is switched from high speed to stop, it is necessary, if looping of the recording tape is to be avoided, to brake the supply spool to a greater extent than the take up spool.

This is generally accomplished by servo brakes, which depend on direction of rotation. Moreover, since a large rotational energy is to be dissipated, the brakes are not only big and heavy, but are also subject to considerable wear and hence must be frequently adjusted.

Therefore, it has already been proposed that high speed braking be achieved by impressing a voltage briefly on the winding motor of the supply or drawn spool, thus creating a reverse rotational moment. The time during which the braking moment must work, naturally, depends on the particular state of the winding spool, and is therefore, subject to considerable fluctuations. Such an operation could previously only be successfully conducted if the recording equipment was under human-visual control and the braking moment could be suitably measured. This process has the disadvantage that the braking operation depends on skill of the operating personnel, and it failed completely when remote control equipment was used in which the operator could not see the tape's progress.

A further problem of the prior art had to do with remote control recording instruments. These instruments must have a tape shut off. If not, the tape can run out of the instrument without the user noticing it. These kinds of shut off tapes can be designed in many ways, by perforating the end of the tape, closing electrical contacts by the sensor arm, metallizing the end of the tape that closes the electrical contacts, by a transparency different from that of the ordinary recording tape, or by a modified reflection power of the end of the tape, which is picked up by photoelectric devices. All these expedients are to no avail, however, if the tape end merely stops the machine; the remote controller must also be prevented from subsequently restarting the machine in the "wrong" direction, i.e., the running direction in which the tape has run before responding to tape cut-off and would, therefore, run completely out of the instrument.

These and other short-comings of the prior art are avoided in this invention. In the invention, use is made of a novel memory device which senses and remembers the direction of tape motion until the tape motion is reversed. This device is incorporated in a control circuit which senses the direction of the fast forward or reverse running tape. When the recorder is stopped, the control circuit withdraws the driving current from the winding (pick up) spool and transfers it to the drawing (supply) spool thereby using the drawing motor to brake the drawing (supply) spool. The braking drawing spool is energized until the tape motion is stopped, at which time the drawing motor is no longer energized. In one embodiment, the memory device remembers the last moving direction of the tape after it has come to a stop. This feature is put to advantage when the tape recorder has an automatic stop produced by a sensing of an approaching end of the tape. A memory device is so arranged in the circuit that a restart of the tape in the same running direction as it was previously operating, is barred. In other words, the tape can only run in the opposite direction and the tape cannot be completely run off the spool.

According to the invention there is provided a control arrangement for a recording tape which includes first and second storage means for storing the tape, means for transferring the tape in a first direction from the first storage means to the second storage means, and for transferring the tape in a second direction from the second storage means to the first storage means; and a memory for sensing the direction of said transfer and storing information as to said direction after the transfer has stopped. The above combination of elements may be used alone or in combination with an end of tape sensor which senses an approaching end of the tape, and stops the tape before the end is reached. This further aspect of the invention includes means controlled by the memory and the end of tape device for permitting operation of the tape transfer only in a direction opposite to the last running direction, i.e., opposite the direction stored in the memory.

According to a further aspect of the invention, there is provided a memory for sensing and storing the information as to the direction of a moving tape, made up of a first friction wheel connected to rotate in accordance with the direction of the transfer of the tape; a swinging arm pivotally mounted and capable of alternatively assuming one of two positions; a second friction wheel pivotally mounted at one end of the swinging arm and engaging said first friction wheel and driven thereby for moving said swinging arm into a first position when the first friction wheel rotates in one direction and to a second position when the first friction wheel rotates in the opposite direction; and an electrical switch having movable contact mounted on said swinging arm, and a pair of fixed contacts, said movable contact making electrical contact with one or the other of said fixed contact in accordance with the position of said arm.

The construction of illustrative embodiments as well as further objects and advantages thereof, will become apparent when read in conjunction with the accompanying drawings wherein.

Figure 1:
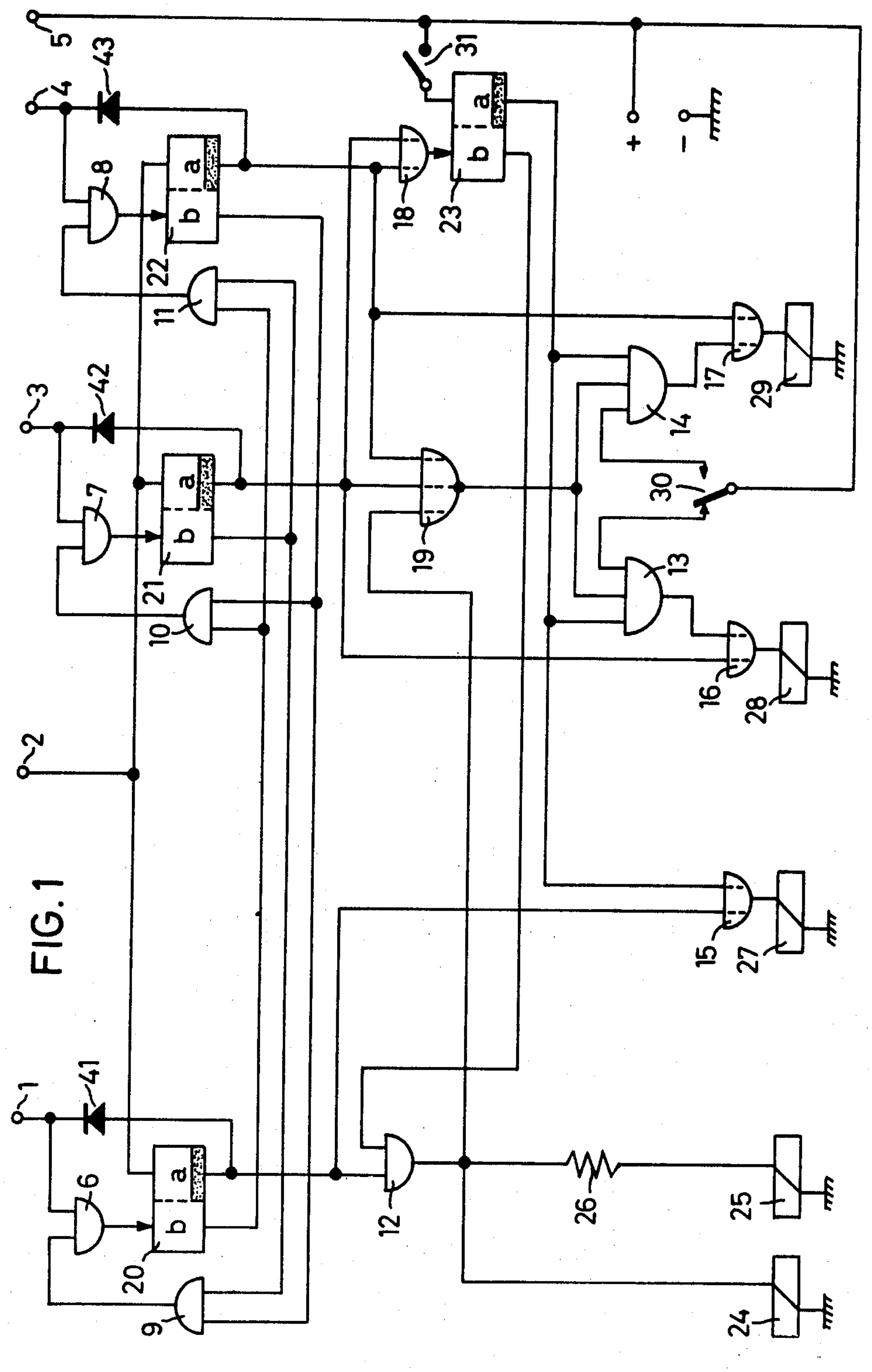
FIG. 1 is a schematic diagram of a portion of a control circuit for a tape drive incorporating an embodiment of the invention.

In FIG. 1 there are five terminals 1 through 5 for receiving command signals and control operating voltages. Terminal 1 may be a local or remotely serviced terminal and receives a command pulse for normal running, i.e., for forward movement of the takeup and supply spools T, S (shown in FIG. 8) for recording and playback. Terminal 2 is for a stop signal. A pulse applied to the terminal 3 is to initiate fast forward movement of the spools; and applied to terminal 4 is to initiate rewind, i.e., a fast backward winding of the spool. Terminal 5 is connected to control operation voltage to be described below. Typically, each of the command signals applied to the terminals 1, 3, and 4 is a positive pulse; and the signal applied to the stop terminal is a positive pulse or a continuous positive potential.

The circuit of FIG. 1 includes a plurality of AND gates 6 through 14. Each of the gates 6 through 14 is of a kind which provides a positive potential or high signal at its output when the signals applied to all of its inputs are high signals. Each of the gates 6 through 14 provides a ground potential or low signal at its output when any or all of the signals applied at its input are at a low potential. The circuit of FIG. 1 also includes several OR gates 15, 16, 17, and 18. Each of these gates 15 through 18 are of a kind which provide a high signal at its output terminal when a high signal is applied to any one of its input terminals. An INVERTING-OR gate 19 is also used in FIG. 1. It signals "low" at an output terminal when any of the signals impressed at its input terminals is a high potential. The INVERTING-OR gate 19 maintains a high signal at its output when all of the signals at its input are low. The terms high signal and low (potential) signal may be any two different and arbitrarily defined voltage amplitudes. Each amplitude may be thought of as a binary number. Typically, the high signal may be +12 volts, and the low signal may be ground potential. Although the two amplitudes might be both positive, or both negative, or positive and negative. The potential (or control operation voltage) connected to terminal 5 is equal to the high signal, and in the above example is +12 volts.

The circuit further includes a plurality of bi-stable multivibrator circuits designated by blocks 20 through 23. The convention employed here to represent each multivibrator is a rectangle divided in half into *b* and *a* portions or boxes. The *a* portion is further divided into a shaded area and an unshaded area. Four leads are connected to the multivibrator rectangle. Two are input leads which are shown in the drawings connected to the top of the rectangle, with one lead to the *b* box and having an arrow, and the other lead going to the unshaded portion of the *a* box. The remaining two leads are output leads and are shown connected to the lower portion of the rectangle. One lead is connected to the *b* box (and is distinguished from the input lead to the *b* box in that the input lead has an arrow). The other output lead is connected to the shaded area of the *a* box. The multivibrators employed here are of a kind that are switched by positive going signal, i.e., the rising portion or leading edge of a positive pulse. When a positive going signal is applied to the input *b* lead (arrowed lead into the *b* box), a high signal is provided and maintained at the output of the *a* box (lead at the shaded portion of the *a* box). This may be termed the "set" condition. While in the set condition the output lead from the *b* box has a low signal. When a positive going signal is applied to the input terminal connected to the unshaded *a* box, the multivibrator switches and a high signal appears, and is maintained, at the *b* output terminal of the multivibrator. This pair of input and output terminals may be termed the "reset" terminals and when activated define the "reset" condition of the multivibrator. When in the reset condition, the output on the set terminal (terminal to the shaded *a* box) is a low signal.

The control terminals 1, 3, and 4 are interconnected with a circuit made up of gates 6 through 11 and multivibrators 20, 21, and 22, in such a way that only one function (e.g., record, rewind, or fast forward) may be operated at a time, and that it is impossible to switch from one function to another without first energizing the stop button. The circuit and its operation may be traced in detail as follows. Associated with the record terminal 1 is the multivibrator 20 and the AND gates 6 and 9. A similar circuit is associated with the fast forward terminal 3 and is made up of multivibrator 21 and gate 7 and 10. A still further similar circuit is made up of multivibrator 22 and gates 8 and 11 and is associated with the rewind terminal 4. The stop terminal 2 is connected to the reset input terminals of multivibrators 20, 21, and 22. Assume a positive pulse is applied to terminal 2 and that the multivibrators 20, 21, and 22 are in the reset condition with a high signal from the output *b* lead. This high signal from multivibrator 20 is applied to the AND gates 10 and 11, which are associated with the other two multivibrators. Likewise, the high output from multivibrator 21 is applied to the AND gates 9 and 11; while the high output from multivibrator 22 is applied to AND gates 9 and 10. In this initial or stop condition, each of the gates 9, 10, and 11 is "fully qualified" and each gate passes a high signal to its output and thence to its associated AND gate 6, 7, or 8. When a command pulse is applied to terminals 1, 3, or 4, it is passed to the associated AND gate 6, 7, or 8. In the stop condition, each of these gates 6, 7, 8 is partially qualified, (i.e., a high signal in one but not all of the input leads). The command pulse from terminals 1, 3, or 4 completes the qualification, and the qualified gate passes the pulse to the multivibrator 20, 21, or 22 to switch the state of the multivibrator and render it in the set condition.

For example, when a command signal is applied to terminal 1, the pulse passes through gate 6, and sets multivibrator 20. The reset output from the *b* box goes low, and the set output from the *a* box goes high. The high output is fed back through a diode 41 to the gate 6 and locks, or holds, the multivibrator 20 in the set condition. The low output from the *b* box of the multivibrator is applied to gates 10 and 11 to disqualify them, i.e., for maintaining a low signal at their output. The low signals from gates 10 and 11 are applied respectively to gates 7 and 8 which in turn are disqualified. The result is that should a command pulse be applied to terminals 3 or 4, gate 7 and 8 (being disqualified) will not pass the pulse to multivibrators 21 or 22. By this arrangement, it is not possible to switch the tape mechanism from one mode to another mode (i.e., from record to rewind) without first going through the stop mode (i.e., applying a pulse to terminal 2 and resetting all of the multivibrators 20, 21, and 22). It will be appreciated that the circuitry associated with terminal 3 and with terminal 4 is analogous to that associated with terminal 1. In view of the similarity it is not necessary to repeat or retrace the operation of a pulse being applied to the terminal 3 or 4.

Continuing with this example of record mode, terminal 1 is activated and the multivibrator 20 is set; the *a* output from multivibrator 20 which is now high, is applied to an AND gate 12. A second input to the gate 12 comes from the multivibrator 23 which, as will be explained below, is at this instant in the reset condition with a high signal at its *b* output. The high signal is passed from the AND gate 12 to a relay 24 which energizes a transport role motor (not shown) as well as the winding motors (not shown) to low operating voltage for normal record or playback running. The output from AND gate 12 is passed through a time component 26 and energizes a relay 25 which turns on holding role magnets (not shown) for the transport roles (also not shown).

The set or *a* output from multivibrator 20 is also applied to an OR gate 15 and thence to a relay 27 which when energized controls a braking magnet (not shown).(This magnet is not a true operating brake but only a slight simple arresting brake in the spool reset state).

Thus it is seen that after the multivibrators 20, 21, and 22 are initially in the reset or stop state and a record pulse is applied to terminal 1, the relays 24, 25, and 26 for operating the transport roles and related equipment are energized; and the circuits for activating fast forward and rewind are rendered inoperable. After recording, the stop command signal is applied to terminal 2 and multivibrator 20 is reset and relays 24, 25, and 27 drop out.

Figure 8:
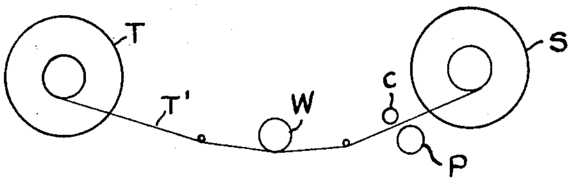
FIG. 8 is a schematic illustration of the deck of a tape recorder including the tape supply and takeup reels.

If multivibrator 21 is set by a command pulse at terminal 3 (fast forward) then a high signal appears at the set output or *a* box lead. This high signal is passed through OR gate 16 to relay 28 which connects a high operating voltage (not shown) to the winding motor (not shown) for a fast forward speed of the spools. The set or *a* output from multivibrator 21 is also applied through OR gate 18 to set a multivibrator 23. It is noted that the tape deck of the apparatus of the present invention is illustrated in FIG. 8 and shows the conventional arrangement of the takeup spool T and supply spool S for passing the tape T' along the recording head wheel W and between the capstan C and pinch roller D.

The set output from the multivibrator 23 is applied through OR gate 15 to energize the relay 27 which controls exciting braking magnets. This high signal set output from multivibrator 23 is also applied to AND gates 13 and 14 to partially qualify these gates. A second input to gates 13 and 14 is through INVERTED-OR gate. The third and last input to AND gates 13 and 14 is from a memory shown schematically as 30. INVERTED-OR gate 19 which provides the second input to the gates 13 and 14 has three inputs. This circuit will provide a high signal when all of the inputs are low, and provide a low signal when any or all of the inputs are high. When the fast forward circuit (multivibrator 21) is activated, two of the inputs from gate 12 and multivibrator 22 are low, but the set output from the multivibrator 21 is high and the INVERTED-OR gate 19 applies a low signal to the AND gates 13 and 14. As will be noted below, when all of the multivibrators 20, 21, and 22 are in the reset condition, all of the inputs to INVERTED-OR gate 19 are low, and its output then becomes high.

The third and last input to AND gates 13 and 14 is from a memory shown schematically as 30. The design of the memory 30 for recording the direction of the high speed movement of recording tape will be described later. Suffice it to say here that under the influence of the forward running recording tape, the memory represented diagrammatically by switch 30 is placed on the right side and thus qualifies the AND gate 14. When the fast forward operation is stopped by applying a pulse at terminal 2, multivibrator 21 returns to its reset condition, relay 28 drops out, and the winding motor for forward winding becomes current free. Simultaneously, all three multivibrators 20, 21, and 22 are in the reset condition with a low potential on their set or *a* outputs. These three outputs are connected (multivibrator 20 via gate 12) to INVERTED-OR gate 19 which in turn provides a high signal to partially qualify the AND gates 13 and 14. With the memory 30 at its right contact position, gate 14 is fully qualified and a positive or high signal passes from gate 14 through gate 17 to a relay 29. Relay 29 connects a rewind motor (not shown) to a source of high operating voltage under which action the spools are arrested and the recording tape speed is brought to zero. When the tape velocity comes to zero (or when the direction of the recording tape speed begins to reverse) a second switch 31, which will be described in detail later, is closed. Switch 31 is connected between terminal 5 (which has a high voltage signal applied thereto) and the reset input to multivibrator 23. Closing of this switch 31 passes a command signal from terminal 5 through switch 31 to a reset input on multivibrator 23. Resetting the multivibrator produces a low signal on the *a* output and thereby causes the relay 27 controlling the braking magnet to drop out. The low signal also disqualifies gate 14 and causes the rewind relay 29 to drop out. In summary, when the recorder is functioning in the fast forward mode, the brake magnet relay 27 and the forward winding motor is activated through the relay 28. When the stop signal is applied, the motor is disengaged due to relay 28 dropping out, and the rewind motor is activated via relay 29 to brake the spool. When the tape motion comes to zero, a circuit shown by switch 31 is opened, which causes the brake magnet relay 27 to disengage and the rewind motor relay 29 to be de-energized, thereby brining the spools to a rapid and smooth stop.

An analogous process occurs when there is a switch to reverse by a command pulse being applied to terminal 4 followed by a stop command pulse at terminal 2. The sole difference is that switch 30 is switched to the left in the drawing (in the position shown) under the influence of the backward running recording tape, so that when the stop switch is activated, AND gate 13 passes a signal and energizes relay 28 for activating the fast forward speed motor. When the recording tape speed passes through the zero point switch 31 is closed, multivibrator 23 is reset, and the brake magnet relay 27 and forward winding relay 28 drop out.

Figure 2:
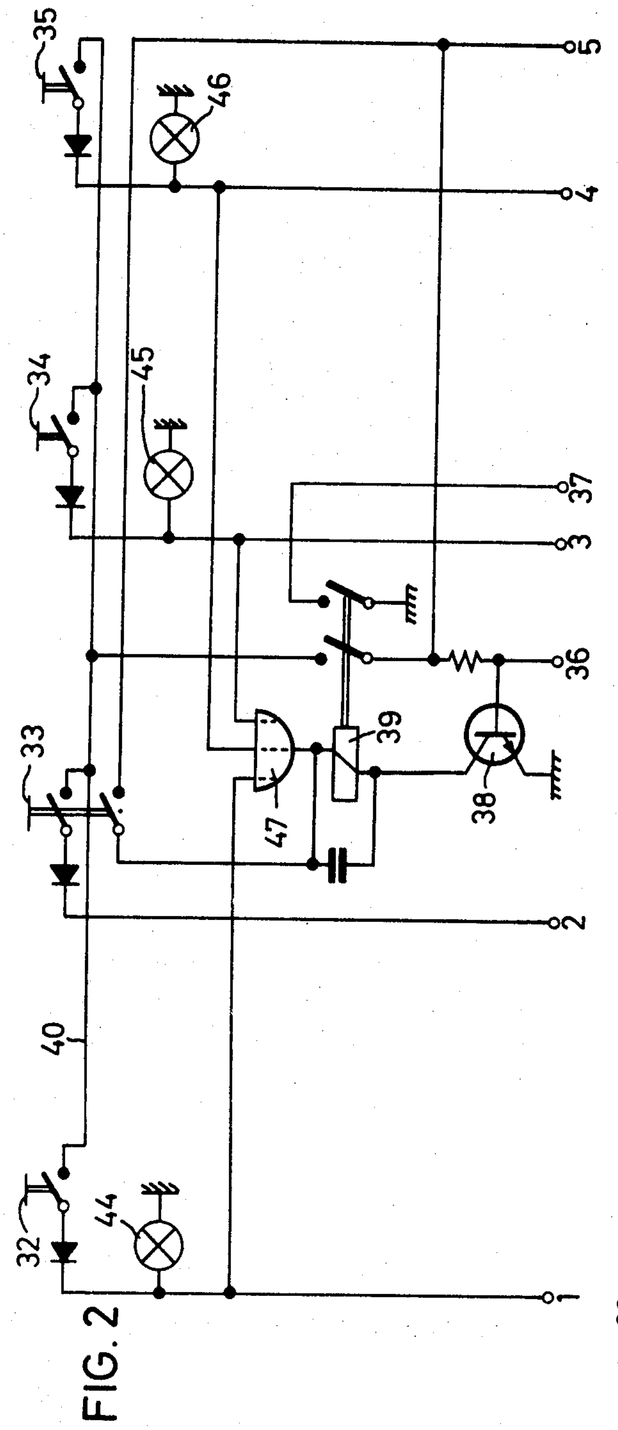
FIG. 2 is a schematic diagram of a control station to be used with the control circuit shown in FIG. 1.

Referring now to FIG. 2 there is shown a schematic diagram of a control station, of which there may be many and one of which will naturally be incorporated in the recorder itself. It consists essentially of non-arresting pushbuttons 32 for normal running, 34 for high speed, and 35 for rapid rewind. Only a stop-button 33 is arrestable; it is completely arrested, either by pressing one of three buttons 32, 34, and 35, or by repressing the stop-button itself.

All buttons are completely arrested in the rest state and any desired remote control unit is started by pressing the stop-button 33. If there is no potential at a point 36, a transistor 38 is, therefore, switched through, a relay 39 picks up and impresses a positive operating voltage on a bus bar 40. Thus, only the other buttons become ready for operation, while pressing button 33 sends the rest impulse to terminal 2 that makes the instrument ready for starting. Now, if one of the three function buttons 32, 34, or 35 is pressed, the above-described processes occur, in which case, signal lights 44, 45, or 46 light up depending on the function switched on, and relay 39 is held closed through OR gate 47.

Figure 3:
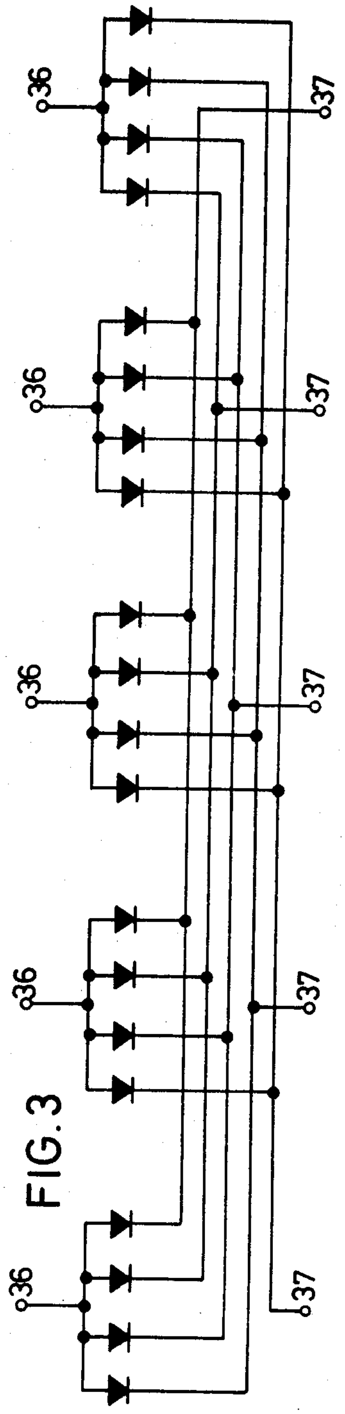
FIG. 3 is a schematic drawing of a diode matrix to interlock individual remote control stations shown in FIG. 2.

The necessary interlocking of individual remote control stations (FIG. 2) one to the other, occurs through connections 36 and 37 and a central diode matrix which is shown diagrammatically for five stations in FIG. 3. Each station, whose relay has picked up once, forms, through its connection 36, the diode matrix, and connections 37, a potential at the base of transistor 38 for all other stations and thus inhibits a pick up of relay 39 in the other stations.

Figure 4:
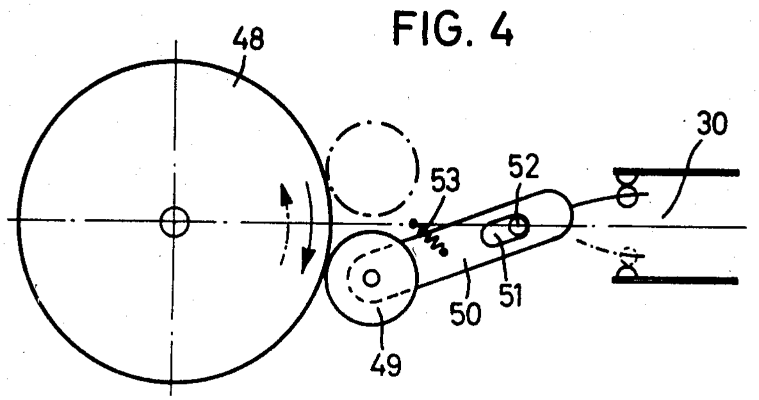
FIG. 4 is a drawing of a mechanical high speed direction memory, used in FIG. 1.

FIG. 4 shows a mechanical example of a high speed direction memory of the recording tape, symbolically represented by switch 30 in FIG. 1. A friction wheel 48 is firmly connected to the supply or winding spool axis, or to a set of gears driving the spools. Wheel 48 drives another friction wheel 49, which is, in turn, positioned to rotate on a swinging arm 50. The latter is fixed by an oblong hole 51, to a pin 52, firmly mounted on the recorder. The arm 50 is so articulated with respect to friction wheel 48, that friction wheels 48 and 49 engage. A movable contact of the switch 30 is connected to arm 50 and the movable contact is connected to a source of electrical potential (not shown in FIG. 4 but shown in FIG. 1 as terminal 5). Depending on the direction, the friction wheel 48 turns, the wheel 49 and 50 will be moved to one of two positions and will correspondingly activate one or two contacts of the switch 30. The sense of rotation and the contact connections are shown in FIG. 1 and explained above.

Figure 5:
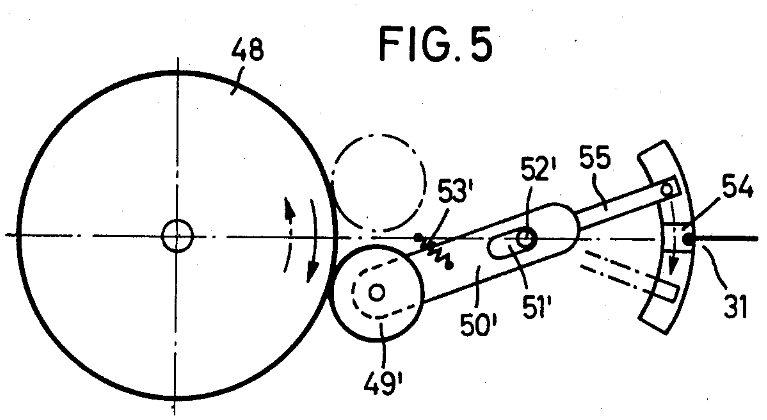
FIG. 5 is a drawing of a mechanical switch for indicating zero tape motion used in FIG. 1.

A quite similar device is shown in FIG. 5, and can be used to realize the switch 31 of FIG. 1. The switch may involve the same friction wheel 48 as shown in FIG. 4, against which a swinging arm 50' pivots a friction roll 49' under the influence of a spring 53'. Here also, the roll 49' flips over from one side to the other when direction of rotation of friction wheel 48 changes. In this case, a contact arm 55 is connected to a source of electrical potential (not shown in FIG. 5, but shown in FIG. 1 as terminal 5), and wipes through contact 54 when the friction wheel changes direction. Thus, switch 31 provides the brief impulse needed to reset accumulator 23 in FIG. 1 and hence stop the instrument.

Figure 6:
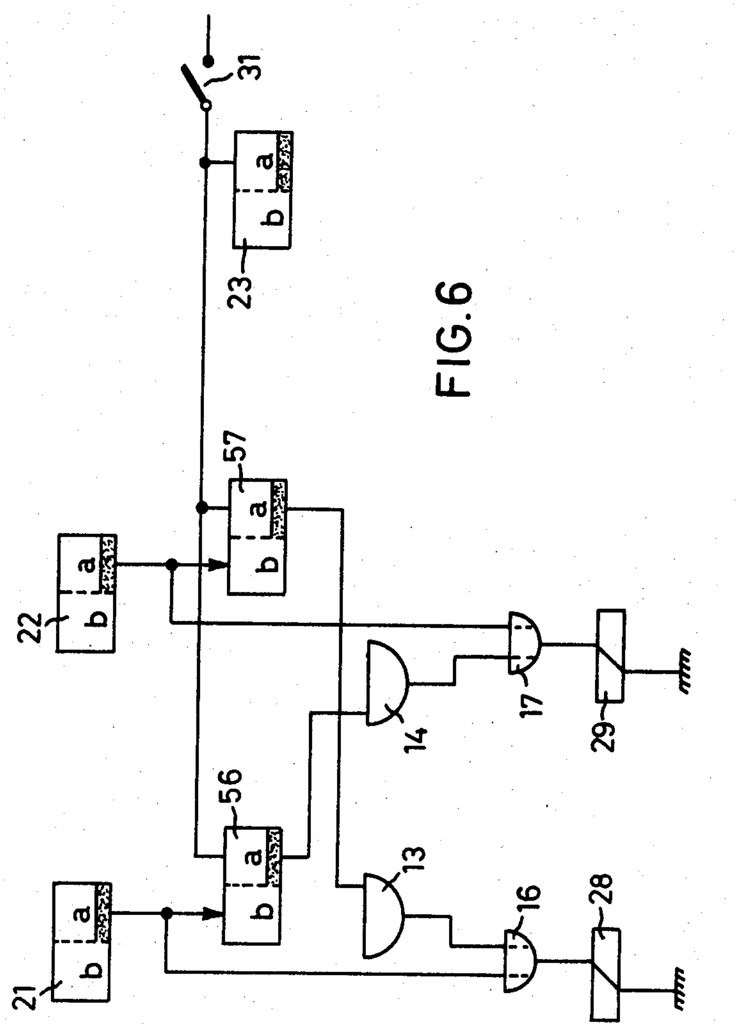
FIG. 6 is a schematic drawing of an electronic high speed direction memory which is an alternative to the mechanical memory of FIG. 4.

FIG. 6 shows how switch 31 in FIG. 1 may be realized by a purely electronic memory, instead of the mechanical memory shown in FIG. 4. Elements which are common to FIGS. 6 and 1 bear like legend. The two position switch 30 shown in FIG. 1 may be replaced by the pair of multivibrators 56 and 57. The set or *a* output of multivibrator 56 is connected to AND gate 14, and the set output from multivibrator 57 is connected to AND gate 13. (Although not shown here it is understood that the gates 13 and 14 have their inputs also connected to INVERTED-OR gate 19 as shown in FIG. 1). Multivibrator 56 has its set input terminal connected to the set output of multivibrator 21 (this is the multivibrator associated with the fast forward motion of the tape). Multivibrator 57 has its set input connected to the set output of multivibrator 22 which is associated with rapid rewind of the tape. The reset inputs to multivibrators 56 and 57 are connected to switch 31. Assuming that the multivibrators 56 and 57 are initially in their reset state, then when a fast forward command signal is applied to terminal 3, multivibrator 21 becomes set and a high signal passes through gate 16 to energize fast forward relay 24. Simultaneously, the high set signal goes to multivibrator 56 and switches it to its set condition, and in turn its set output partially qualifies gate 14. Subsequently, when a stop command signal is applied to terminal 2, gate 19 becomes qualified and passes a positive pulse to gate 14 for qualifying gate 14. A high signal appears at the output of gate 14 and passes through OR gate 17 to rewind relay 29. When the tape motion comes to zero, switch 31 may be considered as being closed, and a pulse passes therefrom to reset multivibrator 56, thereby disabling AND gate 14 and permitting rewind relay 29 to fall open. The operation of the switch of FIG. 6 in the rewind mode is analogous to the fast forward and need not be traced here in detail. Thus, it is seen that the electronic switch of FIG. 6 provides the same memory function as the mechanical switch of FIG. 4.

Figure 7:
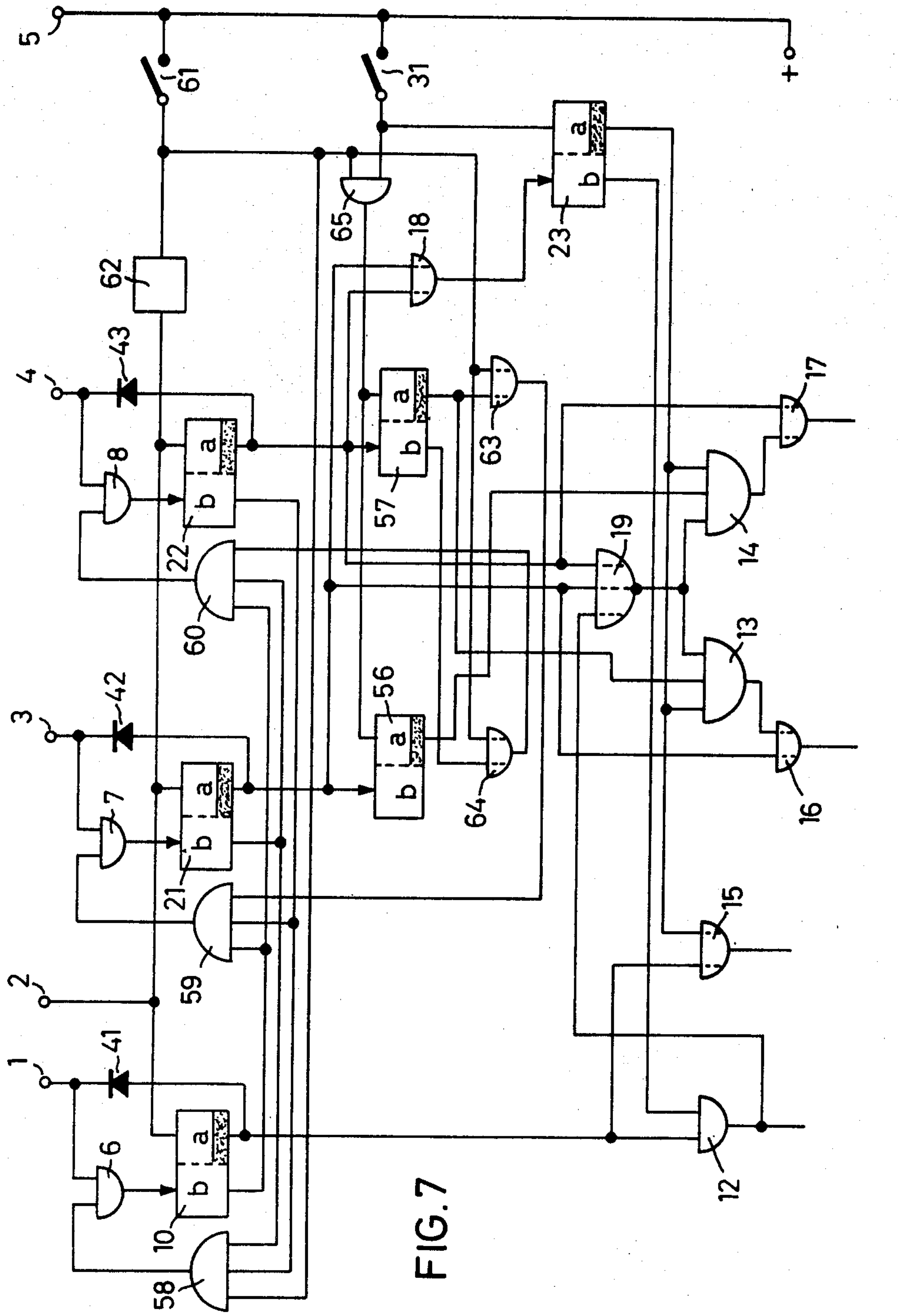
FIG. 7 is a schematic drawing of a portion of a control circuit for a tape drive incorporating a further embodiment of the invention.

FIG. 7 is a schematic drawing of a further embodiment of the invention and shows a control circuit which stops the tape drive when the approaching end of the tape is sensed and also prevents a subsequent restarting of the machine in the wrong direction.

FIG. 7 is similar to FIGS. 1 and 6 and like elements in the figures bear like legend. The AND gates 9, 10 and 11 of FIG. 1 which have two inputs each, are deleted in FIG. 7 and replaced by three input AND gates 58, 59, and 60. The third input to each of these gates is associated with sensing of the tape end. A switching operation is initiated by the approach of the tape end; and it is represented diagrammatically by a switch 61. This switch 61 is normally closed, but is opened on sensing a tape end. A pulse shaper 62, which may be an RC circuit or the like, of a kind which emits a brief positive pulse when switch 61 is opened, is connected to the switch 61, and to the reset terminals of the multivibrators 20, 21, and 22. Thus, the multivibrators are rendered in the reset state (or stop state) when the end of the tape is sensed. Whichever of the tape drives are operative at that moment are stopped as the tape drive relays 24 through 27 are all opened.

As noted above AND gate 58 (which is associated with normal running, i.e., recording or playback) has a third input which is directly connected to switch 61. As long as the end of tape switch 61 is closed, the third input to AND gate 58 is enabled. When the end of tape is sensed, the switch 61 opens, and the gate 58 is disabled.

The third inputs to AND gates 59 and 60 come respectively from OR gates 63 and 64 which in turn are controlled by running direction multivibrator 57. The interconnections here provide the following function. If the machine is operating in the forward, or fast forward, mode when the end of tape is sensed, (switch 61 opens) then the machine may only be operated in the rewind mode. If the machine is in the rewind mode when the end of tape is sensed (switch 61 operates) there it may only be operated in the fast forward mode. Looking at the circuit now in detail, it will be seen that the two OR gates 63 and 64 have an input from the switch 61 and have their outputs connected to the third inputs or gates 59, and 60 respectively. Thus, when there is sufficient tape, i.e., switch 61 is closed, the third input to gates 59 and 60 are high or qualified from the OR gates 63 and 64. A second input to OR gate 64 is from the reset output of multivibrator 57; and a second input to OR gate 63 is from the set or *a* output from multivibrator 57. Multivibrator 57 is in the reset condition when the machine is operating in a forward or fast forward mode. Specifically, there is a high signal on the reset or b output which is applied through OR gate 64, and up to the third input of gate 60; and there is a low signal on the set output which is applied to gate 63. When the end of tape is sensed, switch 61 opens stopping the forward or fast forward operation of the tape. However, it does not change the state of multivibrator 57. (It may be noted here that the closing of switch 31 as the tape stops due to sensing an end of tape, does not reset or effect multivibrator 57 because of AND gate 65 which normally passes the signal from switch 31, but which is disqualified as soon as gate 61 opens). Thus, with multivibrator 57 reset and with the high signal on the third input to gate 60, and a low signal to the third inputs to the gates 58 and 59 the only function which can be initiated is that of a rewind.

The other operating condition of the circuit of FIG. 7 is when the machine is in the rewind mode. Here multivibrator 57 is in the set condition with a high on the set or a output which is applied through OR gate 63 to the third input of AND gate 59. When the end of tape is sensed, and the normally closed switch 61 opens, the multivibrator 22 is reset; however, multivibrator 57 remains in the set state (note again here that the switch 31 does not reset multivibrator 57 because of gate 65 is disqualified by the opening of switch 61). Thus, of the 3 gates 58, 59, and 60, only gate 59 is qualified and only the fast forward function may be initiated.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A control arrangement for a recording tape comprising, first and second storage means for storing the tape, means for transferring the tape in a first direction from the first storage means to the second storage means, and for transferring the tape in a second direction from the second storage means to the first storage means and memory means for sensing the direction of said transfer and storing information as to the direction after the transfer has stopped, said memory means storing the information until a next transfer of the tape and including a switchable device having two states representing the two directions, and means for rendering said switchable device in one state in accordance with the transfer of tape in the first direction, and for rendering said device in the second state when the tape is transferred in said second direction, said switchable device comprising an electromagnetic switch having a movable contact capable of assuming one of two positions corresponding respectively to the first and second states of the device and said switch including a first friction wheel connected to be rotated in accordance with the direction of the transfer of the tape, a swinging arm pivotally mounted and capable of alternatively assuming one of two positions, a second friction wheel pivotally mounted at one end of the swinging arm and in engagement with the first friction wheel and driven thereby for moving said swinging arm into a first position when the first friction wheel rotates in one direction and to a second position when the first friction wheel rotates in the opposite direction; and an electrical switch having a movable contact mounted on said swinging arm, and a pair of fixed contacts, said movable contact making electrical contact with one or the other of said fixed contacts in accordance with the two positions of said arm.

2. A control arrangement for a recording tape comprising, first and second storage means for storing the tape, means for transferring tape in a first direction from the first storage means to the second storage means, and for transferring the tape in a second direction from the second storage means to the first storage means and memory means for sensing the direction storing information as to said direction after the transfer is stopped, said memory means storing the information until the next transfer of the tape, and said first and second storage means including first and second spools; said means for transferring includes a first motor for driving said first spool, and a second motor for driving said second spool and when transferring tape one of said motors is driving and the other is non-driving; said means for transferring further includes means for initiating stopping the transfer, and means controlled by the memory means for impressing on the non-driving motor when a stopping is initiated a command voltage for braking said motor until tape is stopped.

3. A control arrangement for a recording tape comprising, first and second storage means for storing the tape, means for transferring tape in a first direction from the first storage means to the second storage means, and for transferring the tape in a second direction from the second storage means to the first storage means and memory means for sensing the direction of said transfer and storing information as to said direction after the transfer has stopped, said memory means storing the information until the next transfer of the tape, and end of tape means for sensing an end of the tape and for stopping the tape transfer when the end of tape is sensed; and means controlled by the memory means and said end of tape means for permitting operation of said transferring means only in a direction opposite to the direction stored in the memory means.

4. A control arrangement according to claim 3, wherein said means for transferring includes first and second command control means for initiating transfer in the first and second directions respectively, and said means for permitting operation of said transfer means including means for blocking operation of said last operating control means when said end of tape is sensed.

5. A control arrangement according to claim 4, wherein said first and second command control means includes means for blocking operation of the other control means when operating.

6. In a control arrangement for a tape transport, a memory for sensing and recording the direction of the tape movements until it is reversed, comprising a first friction wheel connected to rotate in accordance with the direction of the transfer of the tape; a swinging arm pivotally mounted and capable of alternatively assuming one of two positions; a second friction wheel pivotally mounted at one end of the swinging arm and engaging said first friction wheel and driven thereby, for moving said swinging arm into a first position when the first friction wheel rotates in one direction and to a second position when the first friction wheel rotates in the opposite direction; and an electrical switch having a movable contact mounted on said swinging arm, and a pair of fixed contacts, said movable contact making electrical contact with one or the other of said fixed contacts in accordance with the position of said arm.

7. A control arrangement for a magnetic tape recorder comprising, supply and takeup reels for magnetic tape, drive means operatively connected to said supply and takeup reels and having fast winding and rewinding modes of operation for fast winding the tape in a first direction from the supply reel to the takeup reel and for fast rewinding the tape in a second direction from the takeup reel to the supply reel, means for selectively controlling the mode of operation of said drive means including switching means for causing said drive means to operate in its fast rewind mode when the recorder is to be stopped as the tape is driven in a forward direction and in its fast forward mode when the recorder is to be stopped as the tape is driven in a rewind direction, memory means for controlling said switching means and for storing information representative of the direction of travel of said tape, said switching means being responsive to the information stored in said memory to cause said drive means to operate in its fast rewind mode when the recorder is to be stopped as the tape is driven in a first direction thereby to brake tape movement in said first direction and to cause the drive means to operate in its fast forward mode when the recorder is to be stopped as the tape is driven in a rewind direction, thereby to brake tape movement in said second direction, sensing means for determining a reversal in direction of motion of the tape as the recorder is stopped, and means responsive to said sensing means and the change of direction sensed thereby to stop said drive means, whereby said tape is braked and brought to a complete stop.

8. A control arrangement according to claim 7 wherein the memory means includes a switchable device comprising a first friction wheel connected to rotate in accordance with the direction of motion of the tape, a swinging arm pivotally mounted and capable of alternatively assuming one of two positions, a second friction wheel pivotally mounted at one end of the swinging arm and in engagement with said first friction wheel and driven thereby and for moving said swinging arm into a first position when the first friction wheel rotates in one direction and to a second position when the first friction wheel rotates in the opposite direction; and an electrical switch having a movable contact mounted on said swinging arm, and a pair of fixed contacts, said movable contact making electrical contact with one or the other of said fixed contacts in accordance with the two positions of said arm.

9. A control arrangement according to claim 7 wherein the sensing means includes a switchable device comprising a first friction wheel connected to rotate in accordance with the direction of motion of the tape, a swinging arm pivotally mounted and capable of alternately assuming one of two positions, a second friction wheel pivotally mounted at one end of said swinging arm and in engagement with said first friction wheel and driven thereby for moving said swinging arm into a first position when the first friction wheel rotates in one direction and to a second position when the first friction wheel rotates in an opposite direction and an electrical switch having a movable contact mounted on said swinging arm and at least one fixed contact, said movable contact being in short electrical connection with said fixed contact each time said swinging arm moves from one to the other of said two positions.

10. A control arrangement according to claim 7 wherein said memory means includes two bystable multivibrators, one of said multivibrators being related to and set together with the activation of the drive means, the other of said multivibrators being related to and set together with activation of the fast rewinding mode of the drive means, and both of said multivibrators being responsive to said sensing means and reset only after an indication of a tape transfer reversal by said sensing means.

11. A control arrangement according to claim 7 further comprising means for sensing an end of the tape and for stopping movement of the tape when the end of the tape is sensed; and means controlled by the memory means and said end of tape sensing means for permitting operation of said drive means only in a direction opposite to the direction stored in the memory means.

* * * * *